Sept. 4, 1951  K. B. BRITTON  2,566,873
FLUID CONTROL SYSTEM
Filed March 31, 1944  4 Sheets-Sheet 2

Inventor
KARL B. BRITTON.
by Charles H. Field Attys.

Sept. 4, 1951 K. B. BRITTON 2,566,873
FLUID CONTROL SYSTEM
Filed March 31, 1944 4 Sheets—Sheet 4

Inventor
KARL B. BRITTON.

Patented Sept. 4, 1951

2,566,873

UNITED STATES PATENT OFFICE 2,566,873

FLUID CONTROL SYSTEM

Karl B. Britton, Bratenahl, Ohio, assignor to Thompson Products, Inc., a corporation of Ohio Application March 31, 1944, Serial No. 528,856

13 Claims. (Cl. 158—36)

The present invention relates to a fluid control system. More particularly, the present invention provides a control means which may be selectively adjusted to provide the interconnection of a plurality of fluid supply sources with a number of fluid operated devices.

The invention additionally provides a means which indicates at a glance the exact operating relationship of each of the elements in a fluid control system. Moreover, a series of signalling devices may advantageously be applied to the control means of the invention to designate at once any part or parts which are not functioning properly due to the failure of elements in the system.

The control means of the present invention and its associated parts are particularly advantageously adapted to the control and manipulation of the fuel system for an airplane or the like. According to the present invention, means are provided by which a plurality of fuel tanks may be connected with the airplane engines in such a way that each engine will be fed with fuel from each single tank as well as from any one or more of the other tanks. In addition, certain of the engines and tanks may be cut off entirely or all of the tanks and engines may be cut off.

One of the outstanding features of the invention is the provision of a complete flow diagram on an operator's panel which will show to any crew member the exact disposition of every element of the system at any given time. This factor is of great importance in the operation of both commercial and military planes and enables the operator to control the system from the diagram.

The appearance of a signal in the flow diagram or on the panel of the control unit coincident with the faulty operation of any element in the system is also highly advantageous in the operation of commercial and military ships. Thus, any member of the crew, whether it be the individual responsible for the operation of the several controls or one totally unfamiliar therewith, can instantly detect the failure or faulty operation of any one or more of the elements of the fuel system and restore the operation of at least part of the system through the manipulation of the controls to provide another operating relationship of the elements.

The importance of these features is emphasized in military planes, particularly those engaged in combat, in which one or more of the tanks and/or engines may be quickly put out of commission. In such circumstances, the ability to keep at least certain, if not all, of the engines operating and supplied with fuel by a timely and quickly executed change in the inter-relationship of the several elements of the system is important in keeping the ship aloft and enabling it to return to its base.

It is, therefore, an object of the present invention to provide a fluid control system which combines all of the aforementioned features and advantages.

It is a further object of the present invention to provide a fluid control system which possesses a maximum degree of flexibility in the operation and choice of the fluid supplies and the fluid operated devices when all of the connecting conduits are intact and an ample fluid supply is provided.

It is a still further object of the present invention to provide a fluid control system which possesses a maximum degree of flexibility in the operation and choice of fluid supplies and fluid operated devices when one or more of the connecting conduits is faulty in its operation or broken or when one or more of the supplies is exhausted.

Another object of the invention is to provide a fuel line arrangement for multi-engine, multiple fuel tank vehicles wherein the least number of valves produce the desired selection of possible fuel paths between tanks and engines.

A still further object is to provide a multi-tank, multi-engine fuel system having the least possible number of vulnerability points so that engine failures due to destruction of fuel lines will be minimized.

It is a further object of the present invention to provide a fluid control system which will insure the complete inter-relation of the several fluid supplies and fluid operated devices with a minimum amount of interconnecting conduits and a minimum number of fluid flow control devices in the system.

Another and still further object of the present invention is to provide a panel or other suitable indicating means upon which the exact inter-relationship of the several elements of the fluid control system is clearly and immediately discernible by the operator.

It is a still further object of the present invention to provide in combination with a panel or indicating means on which the outline of the flow diagram of the several elements of the fluid control system is provided, a system of signalling devices which instantly indicates when any one or more parts of the system is not functioning properly.

It will be readily understood that the fluid control system of the present invention is adapted to be employed with any form of fluid supply and fluid operated devices which may be interconnected to control the operation thereof. Therefore, the adaptation of the fluid control system of the present invention to the control of the fuel supply for the operation of a multi-engine airplane represents only one of many possible applications of the teaching of the present invention. This adaptation is employed solely for the purpose of simplification and in no sense of limitation.

Other objects and features of the present invention will be readily apparent as the following description of one of the typical applications of the principles of the present invention proceeds.

Figure 1:
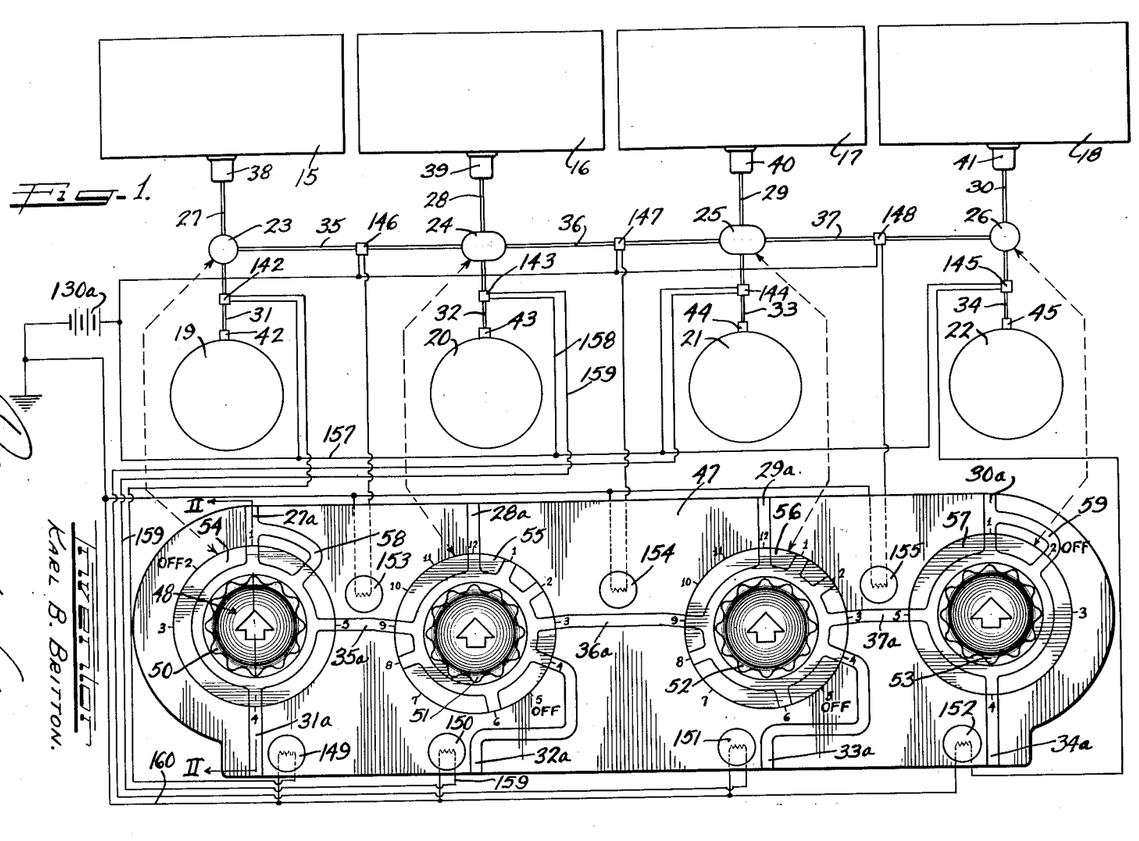
Figure 1 represents a diagrammatic illustration of a fuel supply system for an airplane including four fuel tanks together with four engines and the associated elements of the system which embody the principles of the present invention.

In Figure 1 of the drawings, four fuel tanks 15, 16, 17 and 18 are illustrated as supplying fuel to a corresponding number of engines 19, 20, 21 and 22. A plurality of flow control devices such, for example, as four selector cocks 23, 24, 25 and 26 are interposed between the several fuel tanks 15 to 18, inclusive, and the engines 19 and 22, inclusive, for the control of the flow of fuel to the engines from the several tanks. Each of the selector cocks 23 to 26, inclusive, are preferably of the muliti-position type which will thus provide for the interconnection of each of the several tanks 15 to 18, inclusive, individually with each of the several engines 19 to 22, inclusive, or any combination of the several elements.

Conduits 27, 28, 29 and 30 are adapted to connect the respective fuel tanks 15, 16, 17 and 18 with selector cocks 23, 24, 25 and 26, respectively. Similar conduits 31, 32, 33 and 34 serve to provide a connection between the several selector cocks 23 to 26, inclusive, and their respective engines 19 to 22, inclusive. Conduits 35, 36 and 37 provide cross-connections between the several selector cocks 23 to 26, inclusive.

Associated with the fuel tanks 15 to 18, inclusive, are booster pumps 38 to 41, respectively, which are adapted to exert pressure on the gasoline fed through the several conduits 27, 28, 29 and 30, respectively, for the purpose of preventing vapor lock or other similar difficulties which frequently occur in the fuel systems of airplanes operating at relatively high altitudes. The pressure on the gasoline afforded by the booster pumps 38 to 41, inclusive, is transmitted uniformly throughout the entire system by each of the several conduits 27, 28, 29 and 30 as well as through any of the individual conduits 31 to 37, inclusive, which may be interconnected by the operation of the selector cocks 23 to 26, inclusive, in the operation of the control system. Fuel pumps 42, 43, 44 and 45 are provided for the engines 19, 20, 21 and 22, respectively. The booster pumps 38 to 41 are preferably driven each by its own electric motor while the fuel pumps 42 to 45 are each driven by the engines 19 to 22 on which it is mounted.

The booster pumps 38 to 41, inclusive, may be omitted from the system without adversely affecting its operation in other respects.

A panel 47 which may advantageously take the form of that shown in Figure 1 is capable of being employed with the fluid control system of the present invention. The panel 47 may be an embossed metal or synthetic plastic plate and may be mounted on the instrument panel of the airplane or in any other convenient part of the fuselage which will be both visible and accessible to the pilot, co-pilot, flight engineer or other crew member whose duty it may be to operate such controls.

Figures 2, 10:
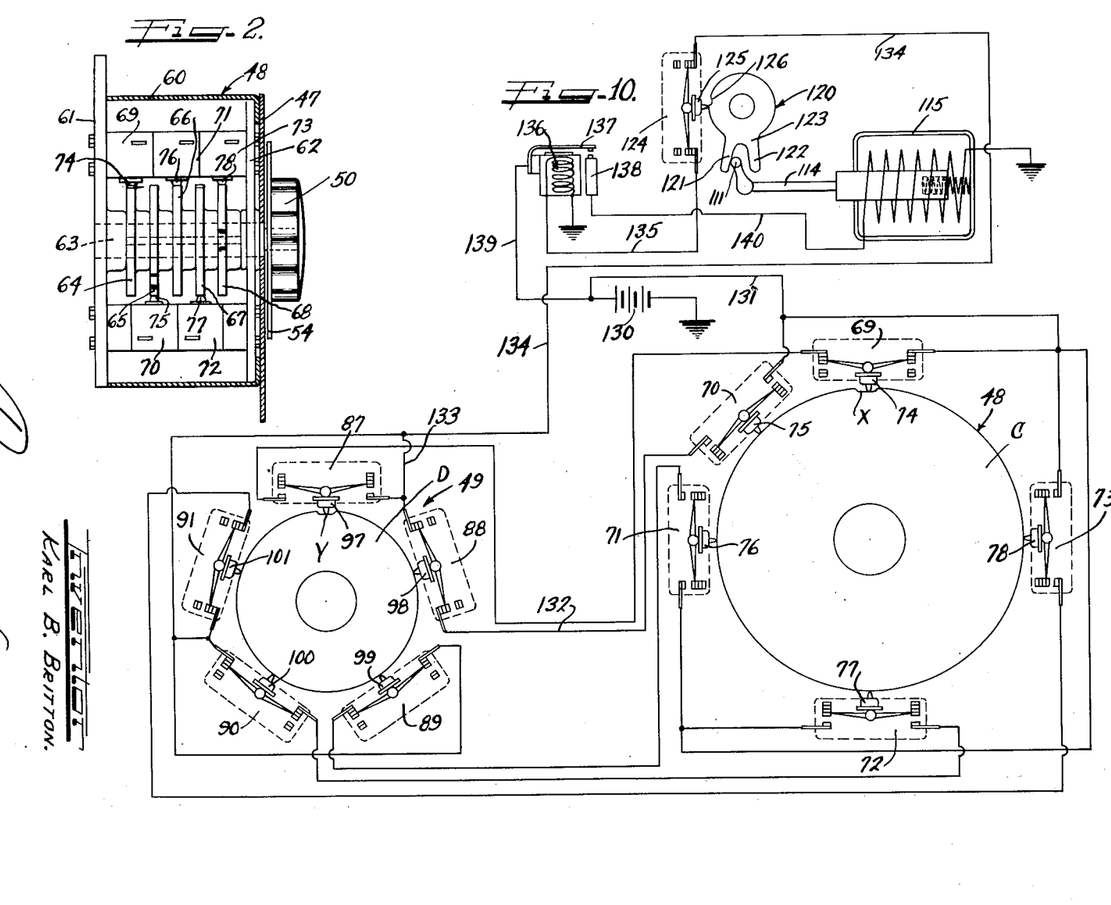
Figure 2 is a vertical cross-section with parts in elevation taken along the line II—II in Figure 1 and illustrating one form of manually operable control means therefor.
Figure 10 is a diagrammatic illustration of a typical wiring circuit incorporating the control means of Figures 2 and 6 in operating one of the fluid flow control devices of the fluid control system illustrated in Figure 1.

At each of the four positions on the panel 47 corresponding in number to the engines and tanks employed in the system is disposed a pilot switch or monitoring means 48 generally of the type illustrated in Figure 2. The monitoring means 48, which will be described by way of example, is actually the unit shown at the extreme left-hand position in Figure 1 and is adapted to provide manual adjustment for controlling the operation of an automatically operated secondary control or actuating means 49 of the type shown in Figure 4. The monitoring means 48 and its actuating means 49 may be interconnected as by means of any suitable form of power transmission system whether it be hydraulic, pneumatic or an electrical circuit of the type diagrammatically represented in Figure 10 to operate the multi-position selector cock 23 with which it is associated.

It will be understood that units embodying elements which are generally similar to the monitoring means 48 and the actuating means 49 will be adapted to be employed in the operation and control of each of the other selector cocks 24, 25 and 26 in the system. As will be explained in greater detail hereinafter, certain of the selector cock units, for example, units 24 and 25, by reason of the greater number of positions required in view of the cross-connections therebetween, may be constructed as one large unit or may advantageously embody a plurality of individual smaller selector cocks connected together in suitable operating relation.

Each monitoring means associated with the panel 47 is manually adjustable by its control knob 50, 51, 52 or 53. Disks 54, 55, 56 and 57 are mounted for rotation with the knobs 50, 51, 52 and 53, respectively. The several disks 54 to 57, inclusive, are preferably thin plates or the like provided with a pattern or diagram on the outer face thereof which corresponds generally to the arrangement of the ports in the plug member of the selector cock which is controlled by the knob.

The panel 47 is provided with an outline or pattern embossed or otherwise applied to its outer face which indicates the general arrangement of the ports in the casings of the several selector cocks and the conduits in the system with which they connect. Thus, the channel outlines of conduits 27a to 37a, inclusive, which extend radially from the several knobs 50 to 53, inclusive, conform generally to the arrangement of the correspondingly numbered conduits 27 to 37, inclusive, in the system. By-pass connections 58 and 59 into the channels 27a and 30a, respectively, are outlined on the panel 47 for the units at the extreme left and right-hand ends of the panel to facilitate certain operating arrangements which may be desired for these units.

For the arrangement of the fuel tanks 15 to 18, inclusive, and the engines 19 to 22, inclusive, shown, the selector cocks 23 and 26 will advantageously be of the type providing five operating positions of which four are "on" positions and one is an "off" position. Each of these positions is identified on the panel 47 adjacent the respective units by the numerals 1 to 5, inclusive, disposed about the outer periphery of the disks. An arrow formed on each of the knobs 50 and 53 when manually rotated to a position opposite each of said numerals, in turn, will cause the actuating means interconnected with the monitoring means operated by said knobs to shift the plug member of the associated selector cocks to provide any selected one of the operating positions thereof. At the same time, the rotation of the knobs 50 and 53 will turn the respective disks 54 and 57 to position each port outline thereon so as to register with each of the channel outlines on the panel 47 corresponding to each of the possible operating positions of their respective selector cocks 23 and 26.

As shown in Figure 1, the arrows on the knobs 50 and 53 are disposed adjacent the numeral 1 in each case on the panel 47 so that the selector cocks 23 and 26 associated therewith will, therefore, be in their first operating positions in which each port is operatively connected with one of the several conduits extending therefrom to the associated fuel tank and engine as well as to the adjacent one of the selector cocks 24 and 25. This relationship will be at once apparent from an inspection of that portion of the flow diagram associated with each of the aforementioned operating elements. It will be noted also that the numerals on the panel 47 associated with the disk 54 and knob 50 progress in a counter-clockwise direction while those associated with the disk 57 and knob 53 progress in a clockwise direction. Irrespective of this arrangement of the numerals indicating the several positions of the units, the knobs 50 and 53 may be rotated in either direction when they are being manipulated without in any way affecting the operation of the apparatus.

The monitoring means 48, to which reference has previously been made, may be of any suitable form but is preferably of the type illustrated in Figure 2. This monitoring means 48 is provided with a generally cylindrically shaped shield or casing 60 secured in any suitable fashion to the back of the panel 47. The casing 60 has a pair of spaced end walls 61 and 62 in which a shaft 63 is rotatably mounted for manual control by the knob 50.

That portion of the shaft 63 extending between the walls 61 and 62 has a plurality of cam disks 64 to 68, inclusive, suitably secured and keyed thereto for rotation therewith. Each of the cams 64 to 68, inclusive, has associated therewith one of a group of transfer switches 69 to 73, inclusive, each of which is provided with one of the shiftable nibs 74 to 78, inclusive. The several nibs 74 to 78, inclusive, are maintained in contact with the peripheral surface of their respective cams 64 to 68, inclusive, by virtue of their being mounted in staggered relation on diametrically opposed sides of the shaft 63 in such fashion that as the shaft is rotated one of the nibs will register with one of the notches 79 to 83, inclusive, on their respective cams 64 to 68, inclusive (see Figure 3).

Figure 3:
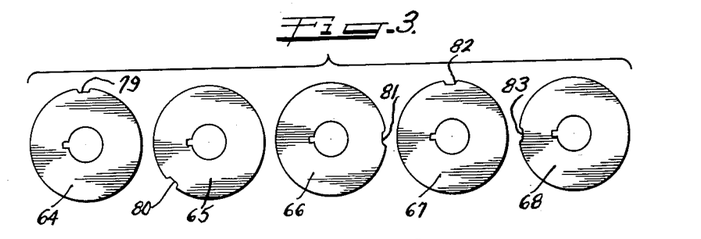
Figure 3 is a plan of the cam disks employed in the control means of Figure 2.

In this way, each of the several switches 69 to 73, inclusive, is held in open position until its nib registers with the corresponding notch in the cam disk associated therewith. The registration of the nib on one of said switches with the notch in its associated cam causes the switch to be closed by virtue of the engaging of the contacts upon the shifting of the nib to its extended position. The arrangement of the cam disks 64 to 68, inclusive, on the shaft 63 of the monitoring means 48 is such that each of the notches 79 to 83, inclusive, on said cams will register with that one of the nibs 74 to 78, inclusive, on its associated one of the switches 69 to 73, inclusive, in turn as the knob 50 is positioned with the arrow thereon directed toward each of the digits designating one of the operating positions in the flow diagram of the panel 47.

Figure 4:
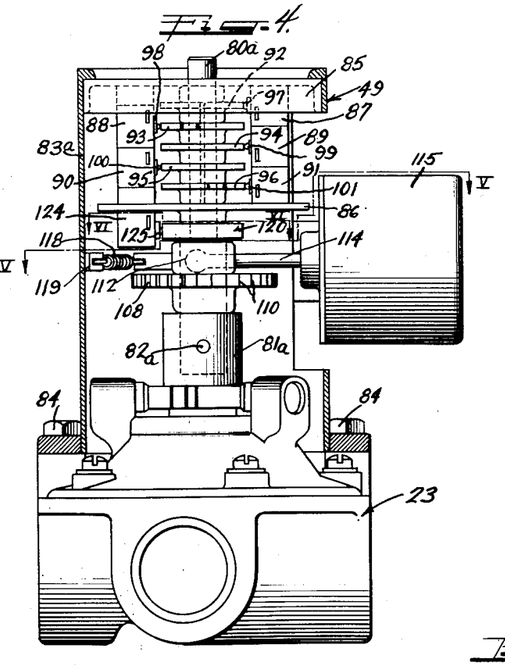
Figure 4 is an elevation with parts in section and broken away illustrating one form of mechanism for operating the fluid flow control devices employed in controlling the flow of fuel from the supply tanks to the engines in the system in Figure 1.

The manual adjustment of the knob 50 on the panel 47 will, therefore, serve to adjust one of the transfer switches 69 to 73, inclusive, through the action of the cams 64 to 68, inclusive, for selectively operating the actuating means 49 of Figure 4 of the drawings through a suitable wiring circuit to shift the selector cock 23 to one of its operating positions. The actuating means 49 includes a vertical shaft 80a which is secured to the stem portion of the plug member for the selector cock 23 as by means of a socket 81a in which an end of the shaft is secured as by means of a pin 82a. A housing 83a of substantially cylindrical shape is disposed about and in concentric relation with respect to the axis of the vertical shaft 80a being secured to the mounting flange of the selector cock 23 as by the bolts 84.

The housing 83a has a flanged plate 85 disposed at its uppermost end and adapted to receive the vertical shaft 80a therethrough so as to be rotatably supported in a suitable boss or the like formed on the underside of the plate. The flanged plate 85 cooperates with a base plate 86 to support therebetween in staggered relation on diametrically opposite sides of the vertical shaft 80a a plurality of transfer switches 87 to 91, inclusive, which correspond to the transfer switches 69 to 73, inclusive, of the monitoring means 48.

One of a plurality of cam disks 92 to 96, inclusive, secured and keyed in driving relation to the vertical shaft 80a is provided for operating each of the transfer switches 87 to 91, inclusive. As in the case of the monitoring means 48 the several cams 92 to 96, inclusive, are adapted to contact with their peripheral edges the nibs 97 to 101, inclusive, of the respective transfer switches 87 to 91, inclusive.

In the case of the transfer switches 87 to 91, inclusive, associated with the actuating means 49, the contacts of the switches are normally closed as opposed to the normally opened position of the switches 69 to 73, inclusive, of the monitoring means 48. One of the switches 87 to 91, inclusive, of the actuating means 49 will, however, be shifted to open position upon registration of one of the several respective nibs 97 to 101, inclusive, of said switches with one of the notches 102 to 106, inclusive, of the respective cam disks 92 to 96, inclusive.

The rotation of the vertical shaft 80a which actuates the plug member of the selector cock 23 is accomplished by a stepping motor or ratchet drive which incorporates a ratchet wheel 108 secured and keyed to the vertical shaft 80a being actuated by the pawl member 109 (Figure 5) which engages one of the several teeth 110 formed on the periphery of the ratchet wheel 108. The ratchet wheel 108 drives the vertical shaft 80a through a small arcuate path corresponding to the central angle subtended by each of the teeth 110. The pawl 109 is mounted so as to pivot about a pin 111 secured to a swingable lever arm 112 freely swingably mounted about the vertical shaft 80a. The arm 112 is adapted to be rotated about the shaft 80a by the extension 114 within certain restricted limits defined by a suitable stop 113 and the retracted position of the core of a solenoid 115 to which said extension 114 is secured.

Figure 5:
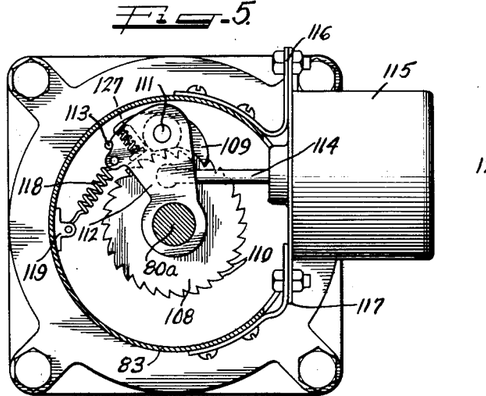
Figure 5 is a horizontal cross-section taken along the line V—V in Figure 4.

The solenoid 115 is mounted as by means of a pair of brackets 116 and 117 on the outer wall of the housing 83a so that the extension 114 projects through an aperture therein to operatively connect with the arm 112. The extension 114 on the core of the solenoid 115 is adapted upon the energization of said solenoid to swing the arm 112 about the axis of the vertical shaft 80a or toward the right as seen in Figure 5 against the restraining action of a spring 118, one end of which is secured to the arm 112 and the other end of which is fixed to the wall of the housing 83a as by means of a mounting 119. A cam member 120 is swingably mounted about the vertical shaft 80a and is adapted to be moved through an arcuate path by contact of the pin 111 mounted upon the arm 112 which extends upwardly therefrom and contacts one or the other of the fingers 121 or 122 of the forked portion 123 of said cam member.

Figure 6:
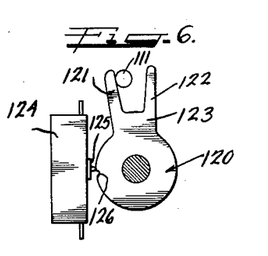
Figure 6 is a horizontal cross-section taken along the line VI—VI in Figure 4 with parts omitted in the interest of clarity.
Figure 7:
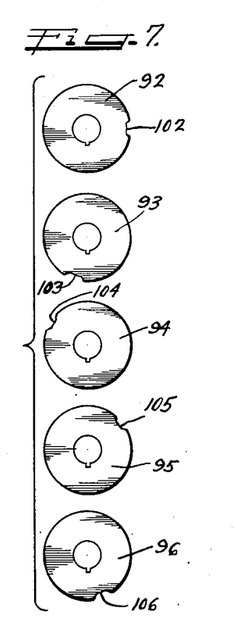
Figure 7 is a plan of the several cam disks employed in the operation of the control mechanism of Figure 2.

This operation of swinging the cam member 120 through a limited arc serves to actuate a transfer switch 124 mounted upon the underside of the base plate 86 in the housing 83a. The nib 125 of the transfer switch 124 is shifted between open and closed position of the contacts thereof by intermittent engagement and disengagement with the notch 126 and the annular periphery of the cam member 120. The making and breaking of the electrical circuit extending through the transfer switch 124, an operation which will be clarified by an inspection of Figure 6 of the drawings, causes an intermittent energizing and deenergizing of the solenoid 115.

The pawl 109 in engagement with one of the teeth 110 of the ratchet wheel 108 causes said ratchet wheel to rotate as the extension 114 is shifted toward the right thereby moving the arm 112 about the vertical shaft 80a as the solenoid 115 is energized. Upon the deenergization of the solenoid 115, the extension 114 is released and the spring 118 swings the arm 111 back toward the left as seen in Figure 5 against the stop 113. The pawl 109 is maintained in contact with the toothed periphery of the ratchet wheel 108 as by means of the compression spring 127 which serves to urge it constantly into each successive serration on the wheel as the spring 118 retracts the assembly after the extension 114 of the core of the solenoid 115 is released.

The operation of the monitoring means 48 and the actuating means 49 will be best understood by reference to a typical wiring diagram such as that illustrated in Figure 10 of the drawings. In order to simplify the wiring diagram the several cam disks 64 to 68, inclusive, of the monitoring means 48 have been represented by a single cam disk C provided with a suitable notch X in the peripheral surface thereof. The several cam disks 92 to 96, inclusive, of the actuating means 49 have likewise been indicated on the wiring diagram of Figure 10 as being a single cam disk D having a notch Y in the periphery thereof. In this way, the several transfer switches 69 to 73, inclusive, of the monitoring means 48 as well as the similar switches 87 to 91, inclusive, of the actuating means 49 may be disposed in a single plane about the periphery of the respective disks C and D.

As previously indicated, the several switches 69 to 73, inclusive, of the monitoring means 48 are normally open with the exception of any single one of the switches which may at the proper time be selectively operated by registration with the notch X to close an electrical circuit through that switch. The several switches 87 to 91, inclusive, of the actuating means, on the other hand, are, as we have seen, ordinarily closed with the possible exception of the single switch of the group with the nib of which the notch Y on the cam disk D is in registration at such time as the actuating means has shifted the vertical shaft and, therefore, the plug member of the selector cock to the selected position chosen by the operator in the selective operation of the monitoring means 49.

To afford a better understanding of the operation of the control system of the present invention, let us assume that it is desired to retain the position of the several knobs 51, 52 and 53 on the control panel 47 in their illustrated relation in Figure 1 but that it is now, for some reason, desirable to shift the knob 50 to position 2 thereby cutting off the fuel tank 15 and the engine 19 from the fuel supply system. The knob 50 will, therefore, be shifted in a counter-clockwise direction until the arrow thereon is directed toward the digit 2 on the control panel 47.

The shifting of the knob 50 in a counter-clockwise direction corresponds to shifting the cam disk C in Figure 10 or rotating the shaft 63 of the monitoring means 48 until the notch X on the cam C registers with the nib 75 for the transfer switch 70. From Figures 2 and 3, it will be seen that this shifting of the cam disk C in Figure 10 corresponds to shifting the cam disk 65 on the shaft 63 until the notch 80 thereof registers with the nib 75 for its associated switch 70. The switch 69 immediately upon the shifting of the cam disk C is again opened and the switch 70 which was previously opened will now be closed while the other switches in the unit remain in their previously established opened positions.

The closing of the switch 70 immediately completes a power circuit from any suitable power supply such, for example, as the battery 130 through the conductor 131 to one side of the switch 70 and from the other side thereof through a conductor 132 to one side of the switch 88 on the actuating means 49 with which said switch 70 is in series, thence through conductors 133 and 134 from the other side thereof to one side of the switch 124. The switch 124 will be closed, as indicated in Figure 10, for the reason that the cam member 120 will be in the position illustrated due to the fact that the solenoid 115 is deenergized and the notch 126 on said cam member will be out of registration with the nib 125.

Thus, the circuit from the switch 88 of the actuating means 49 is completed through the switch 124 energizing the coil of the relay 136 to close the contact between its contact arm 137 and the fixed contact 138 thereby completing a circuit from the battery 130 through the conductor 139, arm 137, contact 138 and conductor 140 to the coil of the solenoid 115, energizing the same and shifting the extension 114 to the right as seen in Figure 5. This shiftable movement of the extension 114 causes the pawl 109 which engages one of the teeth 110 of the ratchet wheel 108 to rotate the latter as the arm 112 on which it is pivotally mounted is moved toward the right by the extension 114 against the spring 118.

As the extension 114 approaches the extremity of its stroke, the pin 111 previously disposed adjacent the finger 121 of the forked portion 123 of the cam member 120 will now engage the finger 122 thereof rotating the cam member 120 sufficiently to permit the notch 126 therein to register with the nib 125 of the switch 124, opening said switch and breaking the circuit from the switch 88 of the actuating means 49 to the relay 136 so as to break contact between the arm 137 and the contact 138 thereof. This operation deenergizes the solenoid 115 and releases the extension 114 thereof.

The spring 118, upon the release of the extension 114 draws the lever arm 112 back against the stop 113 and positions the pawl 109 in contact with the next tooth 110 on the ratchet 108 in preparation for the subsequent energization of the solenoid 115. When the extension 114 is released upon the deenergization of the solenoid 115, the pin 111 strikes the prong 121 of the forked portion 123 of the cam member 120. This action of the pin 111 causes the notch 126 of the cam member 120 to be shifted out of registration with the nib 125 of the switch 124 thereby causing the switch to be closed and completing the circuit from the conductor 134 through the switch 124 and the conductor 135 to the coil of the relay 136 so as to repeat the series of operations above described.

The intermittent action of the pawl 109 driving the ratchet wheel 108 and the vertical shaft 80a is continued in this manner until the cam associated with the switch 88 of the actuating means 49 is rotated through an arc sufficient to bring the notch therein into registration with the nib 98 of said switch. In the actuating means 49, the cam 93 bearing a notch 103 is the cam which is associated with the switch 88. As seen in Figure 10, however, the corresponding cam disk D will now be positioned with its notch Y in registration with the nib 88 of the switch 88 when the selector cock 23 has been rotated to the desired position as determined by the position of the monitoring means 48 manually selected by the operator.

It will be understood that exactly the same series of operations are performed and similar circuits are created with the positioning of any one of the cam disks associated with the monitoring means 48 in contact with its cooperating transfer switch. Each of the individual circuits will be clear from an inspection of Figure 10 of the drawings. It should be noted that, while the knob 50 of the monitoring means may be rotated in either clockwise or counter-clockwise direction, this will not affect the operation of the actuating means 49 inasmuch as the vertical shaft 80a will always be rotated in a clockwise direction by virtue of the cooperative driving relation between the pawl 109 and the ratchet wheel 108 which is secured to and rotates the vertical shaft 80a.

An identical monitoring means 48 and actuating means 49 is adapted to be employed in the operation of the selector cock 26 of the fuel system illustrated in Figure 1. Monitoring means and actuating means of substantially similar construction and operation may be employed in the actuation of the twelve-position units 24 and 25 in the system.

In order to obtain all of the necessary operating combinations of the several elements of the fluid control system, it is necessary that the selector units 24 and 25 be adapted to provide twelve operating positions of which eleven are "on" positions while one is an "off" position. It will be understood that these requirements may be fulfilled by the use of a twelve position selector cock. Such a unit is, however, exceedingly large and awkward to handle and will obviously only be able to be employed in systems which require single units capable of affording twelve operating positions.

Figure 8:
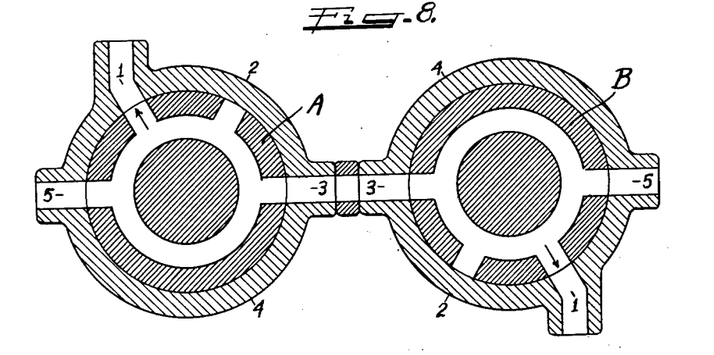
Figure 8 is a diagrammatic representation to show the operation of one form of fluid flow control device which embodies the interconnection of two multi-position selector cocks to provide twelve operating positions.

As an alternative, it may be found desirable to connect together two multi-positioned selector cocks in the manner illustrated diagrammatically in Figure 8 in such fashion that, with the independent operation of each of the plug members associated with each selector cock unit, twelve different operating positions for this unit may be achieved. Thus, a dual unit of this type may be employed for the selector cock units 24 and 25 in the fluid control system of Figure 1.

Figure 9:
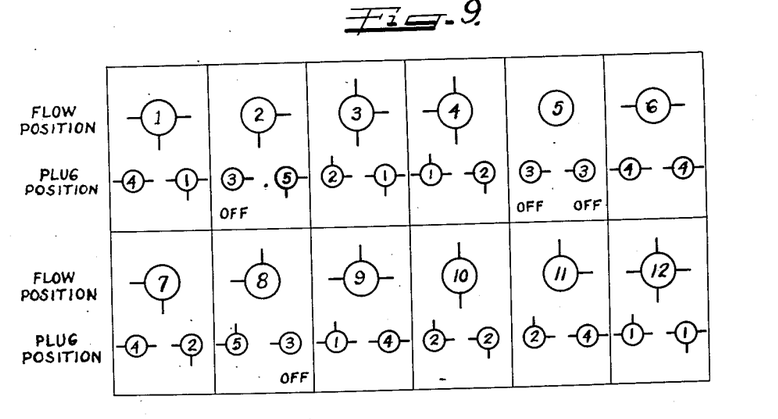
Figure 9 is a chart which illustrates each one of the several operating positions obtainable by the device of Figure 8 and indicating the setting of the plug member of each of the devices for obtaining the desired position.

The diagrammatic representation of Figure 8, it will be understood, is employed solely to indicate the manner in which two standard five position selector cocks may be manipulated and does not represent a true cross-section of a multiple position dual unit. The maximum combination of the several operating positions of each individual selector cock forming the dual unit is outlined in the chart of Figure 9. Each of the twelve flow positions correspond to the setting of the knobs 51 or 52 with the arrows thereon in registration with the associated digit on the panel 47 and the flow pattern provided by the unit is indicated at the top of each box in the chart while the actual disposition of each individual selector cock plug member cooperating to produce the desired flow position is shown adjacent the bottom of each box in the chart.

Thus, in the diagrammatic illustration of Figure 8, if each inner rotatable member A and B is disposed with the arrow associated therewith directed toward the numeral 1 identifying the first position for each of the individual selector cocks employed in the dual unit, the flow pattern of position 12 is provided by the unit. This flow pattern corresponds to the showing in the flow diagram on the panel 47 of Figure 1 having the port outline on the disk 55, for example, cooperating with the channel outlines 28a, 32a, 35a and 36a, which indicate that the correspondingly numbered conduits are interconnected through the selector cock unit 24. An identical arrangement is found in respect of selector cock unit 25 which will be actuated in such a way as to interconnect therethrough the several conduits 29, 33, 36 and 37.

Referring again to Figures 8 and 9, it will be understood that if, by way of example, flow position 1 is required for the dual unit, the rotatable member A must be positioned with its arrow opposite the digit 4 and the rotatable member B with its arrow opposite the digit 1 as indicated in the chart. This arrangement of the elements of the dual unit would result by positioning the arrow on either of the knobs 51 or 52 directed toward the digit 1 on the control panel 47. Each flow position on the chart of Figure 9, therefore, corresponds to the correspondingly numbered position for the knobs 51 and 52 on the panel 47. The independent operation of each one of the pair of multi-positioned selector cocks comprising the dual unit 24 or 25 will, thus, cooperate to provide the illustrated twelve operating positions. On the chart, in each space, the plug to the left represents plug A while the plug to te right represents plug B of Figure 8.

The knobs 51 and 52 will, as we have seen, each selectively operate a monitoring means corresponding generally to the monitoring means 48 of Figure 2. In the operation of a twelve-position unit, however, the monitoring means will have twelve spaced cams for operating a corresponding number of transfer switches. An actuating means generally similar to the actuating means 49 of Figure 4 will be provided for each of the selector cocks comprising the dual unit. The transfer switches of the single monitoring means will be connected in series with one or more of the switches on the two actuating means for the individual selector cocks forming the dual unit to control the position of each individual selector cock in each of its several operating positions.

The booster pumps 38, 39, 40 and 41 associated with the fuel tanks 15, 16, 17 and 18, respectively, serve, as previously explained, to introduce a pressure upon the fuel lines interconnecting the several selector cocks 23, 24, 25 and 26 and the supply lines between said selector cocks and their respective engines 19, 20, 21 and 22. The pressure created upon the fuel in the several conduits 31, 32, 33 and 34 as well as the cross-conduits 35, 36 and 37 may be advantageously employed to advise the operator immediately and automatically of any failure or faulty operation of any of the connecting conduits. The pressure created in the several conduits by the booster pumps 38 to 41, inclusive, remains constant in said conduits until a line is broken or clogged and thus fails to maintain the constant pressure.

A plurality of pressure responsive switches 142, 143, 144 and 145 are interposed in the conduits 31, 32, 33 and 34 between their respective selector cock units 23 to 26, inclusive, and the engines 19 to 22, inclusive. Similar pressure responsive switches 146, 147 and 148 are supplied in the cross-connections 35, 36 and 37, respectively, between the several selector cocks 23 to 26, inclusive. The several pressure responsive switches 142 to 148, inclusive, may advantageously take any desired form but are preferably of the type which will be caused to remain open as long as the pressure is maintained on each of the several conduits in which they are interposed through the action of the booster pumps 38 to 41, inclusive.

As soon as, for any reason, the pressure in any one of the conduits in which a pressure responsive switch may be interposed drops as by reason of the breaking of that particular conduit, the pressure switch associated therewith may be caused to close a circuit and to signal the operator. For instance, the operation of one of the switches may be employed to immediately close an electrical circuit to llight one of a number of tell-tale lights on the control panel 47 adjacent the particular channel outline on the flow diagram on the panel in which the pressure has dropped.

A different power source such, for example, as a battery 130a, or, if desired, the same power source (battery 130) employed in energizing the electrical circuit for the operation of the monitoring means 48 and the actuating means 49 associated with each of the several selector cock units 23 to 26, inclusive, may be employed to energize the circuit for the pressure responsive switches 142 to 148, inclusive, and the respective tell-tale lights 149 to 155, inclusive. In any event, if the pressure falls, for example, in the conduit 32 between the selector 24 and its engine 20, the pressure responsive switch 143 therein is immediately closed and a circuit from the battery 130a is completed through the main conductor 157 and conductor 158 to pressure responsive switch 143, thence through said switch and conductor 159 to the tell-tale light 150 on the panel 47 which is connected with a ground by the conductor 160. The operation of the pressure responsive switch 143, therefore, lights the tell-tale light 150 adjacent the channel outline 32a corresponding to the conduit 32 and immediately notifies the operator concerning this failure in pressure.

To aid in simplifying the task of the operator, it may be found advantageous to place certain symbols on the panel 47 or on the tell-tale lights themselves which will immediately indicate to the operator the most advantageous position of the control knob associated with one or more of the channel outlines in the flow diagram for by-passing the faulty conduit to make the best possible use of the available fuel supply in the several tanks 15, 16, 17 and 18 and to keep as many as possible of the engines 19, 20, 21 and 22 operating. For example, the symbol A—9+ might be employed on or adjacent the tell-tale light 150 to indicate that, when this light is lighted, the conduit 32 may be cut off to give the most advantageous operation of the remaining elements of the fuel system by turning the knob 51 to position 9. The letter A indicates that any suitable setting of the other knobs 50, 52 or 53 which will cooperate with the position 9 of the knob 51 will be satisfactory. The plus sign following the digit 9 on the tell-tale light 150 will indicate that there are other positions of the knob 51 and its associated disk 55 which will serve to cut off the conduit 32 and still provide an opportunity of employing all of the fuel in the tank 16 for the operation of the remaining engines 19, 21 and 22 which can be operated.

Any of several additional features may advantageously be incorpoated in the panel 47 or the fluid control system. For example, it may be found to be desirable to install a signalling arrangement associated with each of the control knobs 50 to 53, inclusive, to indicate immediately when the selector cock unit associated therewith has reached the selected operating position. This could readily be done by employing a set of additional contacts on the open side of the switches corresponding to the switches 87 to 91, inclusive, of the actuating means 49 which will close a separate circuit for each position when the notch Y of cam disk D registers with the proper switch nib.

The structure of the present invention presents a highly advantageous fluid control system. The fluid flow is readily controllable by the operation of two single and two dual flow control units from four control means. The specific operating arrangement is achieved by a minimum of operating elements and interconnecting fluid conduits and is instantly discernible to the operator at all times.

It will be understood that additional units, such as auxiliary tanks or the like, may be employed and may, if desired, be incorporated in the control system. Such units have not been shown for the sake of simplicity but are clearly within the spirit and scope of the invention. These auxiliary tanks may advantageously be hand controlled independently of the remainder of the units without in any way affecting the efficiency of the control system of the invention.

It will, of course, be understood that various details of construction may be varied through a wide range without departing from the principles of this invention and it is, therefore, not the purpose to limit the patent granted hereon otherwise than necessitated by the scope of the appended claims.

I claim as follows:

1. In a fluid control system having a plurality of fluid operated devices, a plurality of fluid supply sources, a plurality of fluid flow control devices, and means interconnecting the fluid flow control devices, fluid supply sources, and fluid operated devices, the improvements of short means for diagrammatically indicating the relationship of each of the interconnecting means with respect to said fluid supply sources and said fluid operated devices and having fluid flow paths indicated thereon, manually controllable means for shifting the fluid flow control devices to open and close certain of the interconnecting means, and means associated with each manually controllable means and movable therewith and having fluid flow paths thereon adapted to register with the fluid flow paths on said chart means and complete the fluid flow paths on the chart means and show the exact flow path of fluid through each fluid flow control device and the interconnecting means associated with each fluid supply source and to each fluid operated device.

2. In a fluid control system having a plurality of fluid operated devices, a plurality of fluid supply sources, a plurality of fluid flow control devices, means for actuating each of said fluid flow control devices, and means interconnecting the fluid flow control devices, fluid supply sources and fluid operated devices, the improvements of chart means showing diagrammatically thereon each of the interconnecting means, manually operated means to selectively operate the actuating means for shifting the fluid flow control devices associated therewith to open and close certain of the interconnecting means, indicator means on each manually operated means and movable therewith and having fluid flow paths thereon indicating the passages of fluid through each fluid control device and, diagrammatically showing on the chart means the exact paths of fluid flow through each fluid flow control device with respect to the interconnecting means associated with each fluid supply source and each fluid operated device, and signalling means on the chart means and connected with certain of the interconnecting means to identify on the chart means a loss of pressure and failure in any of the interconnecting means having said signalling means connected therewith.

3. In a fuel system for an airplane or the like for handling the supply of fuel from a plurality of tanks to a plurality of engines, fluid control means comprising a plurality of multi-position selector cocks, means for actuating each of said selector cocks, conduits interconnecting the selector cocks, the fuel tanks and the engines, a panel having a flow diagram thereon diagrammatically charting each of the several conduits, manually operated means to selectively operate the actuating means for shifting the selector cocks to open certain of the conduits to the flow of fuel therethrough, and a dial mounted on and movable with each manually operated means and having flow paths thereon corresponding to the flow of fluid through each selector cock and cooperating with the flow diagram on the panel to indicate on the flow diagram thereon the flow path of fluid through the several selector cocks with respect to the conduits interconnecting the fuel tanks with the engines as selectively operated by the manually operated means.

4. In a fuel system for an airplane or the like, for handling the supply of fuel from a plurality of tanks to a plurality of engines, fluid control means comprising a plurality of multi-position selector cocks, means for actuating each of said selector cocks, conduits interconnecting the selector cocks, the fuel tanks and the engines, a panel having a flow diagram thereon diagrammatically charting each of the several conduits, manually operated means to operate the actuating means or shifting the selector cocks to open certain of the conduits to the flow of fuel therethrough, a dial mounted on and movable with each manually operated means and having flow paths indicated thereon corresponding to the flow path of fluid through the associated selector cock and cooperating with a flow diagram on the panel to diagrammatically indicate on the flow diagram thereon the flow path of fluid through the several selector cocks with respect to the conduits interconnecting the fuel tanks with the engines as selectively operated by the manually operated means, and signalling means on said panel and connected with certain of the conduits for identifying on the flow diagram lack of pressure in any of said conduits.

5. In a fuel system for an airplane or the like, fluid control means comprising a plurality of multi-position selector cooks, means for actuating each of said selector cocks, conduits interconnecting the selector cocks and connecting the selector cocks in the fuel system, a panel having a flow diagram thereon diagrammatically charting each of the several conduits, manually operated means to operate the actuating means for shifting the selector cocks to open certain of the conduits to a flow of fuel therethrough, a dial connected with each manually operated means and having flow path indicia thereon corresponding to the flow paths in the movable element of the respective selector cock, said dial moving with said manually operated means and cooperating with the panel to diagrammatically indicate on the flow diagram the flow paths of fluid through the several selector cocks with respect to the conduits as selectively determined by the manually operated means, and pressure responsive signalling means connected in certain of the conduits and signal transferring means from said pressure responsive means to said chart means to identify on the flow diagram any part of the system in which a failure occurs.

6. In a fluid control system having a plurality of fluid operated devices, a plurality of fluid supply sources, a plurality of multi-position plural way selector cocks, means for actuating each of said selector cocks, and a plurality of conduits interconnecting the several positions of said selector cocks and the fluid supply sources with the fluid operated devices, the improvements of flow diagram means visibly diagrammatically charting each of the several interconnecting conduits and the paths of the flow of fluid therethrough, manually operated means for shifting the actuating means to selectively operate the selector cocks to open certain of the conduits to the flow of fluid therethrough, and visible indicia mounted on and movable with each manually operated means and indicating thereon the flow paths of fluid through the associated selector cock, for indicating diagrammatically on the flow diagram means the flow paths of fluid through said conduits and the several selector cocks in their various operative positions and through the fluid supply sources and fluid operated devices as governed by the manually operated means.

7. In a fuel system for an airplane or the like, fluid control means comprising a plurality of shiftable, multi-position plural way selector cocks, means for actuating each of said selector cocks, a plurality of conduits interconnecting said selector cocks in their several operative positions and connecting said selector cocks in the fuel system, a panel having a flow diagram thereon diagrammatically charting each of the several conduits, manually operative means to selectively operate the actuating means for shifting the selector cocks to open certain of the conduits to the flow of fuel therethrough, and a dial connected with each manually operated means and having flow path indicia thereon corresponding to the flow paths provided in the movable elements in the respective selector cocks, said dial moving with said manually operative means and cooperating with the flow path indicia upon said panel to complete the flow diagram and show the flow paths of fluid through the several selector cocks and conduits as selectively determined by the manually operated means.

8. In a fluid control system, a plurality of conduits for carrying fluid through the system, a plurality of plural way valves connected with said conduits, means selectively operable to position said valves to provide flow paths of fluid through said conduits and valves, including manually operated primary control means for each valve, a power operated means energized by each primary control means and connected with each valve, for selectively operating said valves and moving them into positions to selectively vary the flow paths of fluid through said valves and conduits, in accordance with the selective-adjustment of said primary control means, a flow diagram charting the flow paths of fluid through the several conduits, movable indicia indicating the flow paths of fluid through the several valves cooperating with the charted flow paths of fluid through the several conduits and movable with the primary control means to disclose at all times on the flow diagram the fluid flow paths of fluid through the several valves and conduits, fluid pressure responsive means in certain of the conduits, and signaling means on said flow diagram cooperating with the charted flow paths of fluid through the several conduits and coacting with the pressure responsive means in said conduits to identify on said flow diagram, by the operation of the appropriate signalling means, any conduits which cease to function properly by lack of pressure therein.

9. In a fuel system having a plurality of supply tanks, a plurality of engines, conduits interconnecting the tanks and engines, pressure means connected with the several conduits for subjecting the fluid in the several conduits to pressure, and plural way valve means in said conduits, the improvements of a control mechanism for each valve means for selectively varying the operating relationship of the several tanks, conduits and engines by shifting the valve means, a panel including a flow diagram charting the flow paths of fluid through the several conduits, and movable indicia movable in acocrdance with movement of said control mechanisms and charting the paths of fluid flow through the valve means and cooperating with the flow diagram for visually diagrammatically disclosing the paths of fluid flow between the several tanks, engines and conduits at any given time for each setting of the control mechanisms, pressure responsive means in certain of the conduits actuated by the variations in the fluid pressure therein induced by the pressure means, an electrical circuit associated with each pressure responsive means, and signal means on the panel and diagram cooperating with the paths of fluid flow on said diagram and operated by the pressure responsive means and identifying on the diagram any conduits in the system which do not function properly by lack of pressure therein.

10. In combination, a plurality of fluid flow conduits, a plurality of plural way valves connected with said conduits and selectively movable into a plurality of selective positions to connect said conduits for the flow of fluid therethrough in a plurality of paths, an actuator for each valve having a plurality of positions corresponding to the different positions of the associated valve, a control panel, movable control means for said actuators on said panel having a plurality of operative positions corresponding to the operative positions of the associated actuators, conduit simulating indicia on said panel indicating the paths of fluid flow through said conduits, and valve simulating indicia on said panel movable with said control means and indicating the paths of fluid flow through the respective valves and cooperating with said conduit simulating indicia and registering therewith in the various operative positions of said movable control means and valves to show the exact flow patterns through said valves and conduits.

11. In combination, a plurality of fluid flow conduits, a plurality of plural way valves connected with said conduits and selectively movable into a plurality of selective positions to connect said conduits in various relationships with respect to each other through said valves, for the flow of fluid therethrough, an actuator for each valve having a plurality of operative positions corresponding to the different operative positions in the associated valve, a control panel remote from said valves and actuators, manually operable movable control means for said actuators on said panel having a plurality of operative positions corresponding to the operative positions of said actuators, conduit simulating indicia on said panel indicating the flow paths of fluid through said conduits, and valve simulating indicia movable with said control means and indicating the flow paths of fluid through said valves and conduits for the various operative positions thereof and cooperating with said conduit simulating indicia to register with and show the exact flow patterns of fluid through said conduits corresponding to the specific operating relationship between the several valves and conduits.

12. In a fluid control system having a plurality of fluid flow control devices each including a plural-way valve element selectively movable into a plurality of operative positions, power means associated with each of said valve elements for selectively positioning said valve elements into their selective operative positions, and a plurality of conduits connected with said valve elements in their several operative positions, the improvements of chart means diagrammatically representing said conduits, manually operable means to selectively actuate said power actuating means and effect shifting of selective of the valve elements into the desired operative positions to open and close the fluid flow paths through certain of said valves and conduits, indicator means on each valve operating means and moved thereby upon movement thereof and having fluid flow paths through said valves charted thereon and cooperating with and diagrammatically showing on the chart means the fluid flow paths established through said conduits in the various operative positions of said valve elements, and pressure responsive signaling means on said chart means and operatively connected with said conduits, to identify on the chart means any conduit wherein a loss in pressure and a resultant failure occurs.

13. In combination, a plurality of fluid flow conduits, a multi-position valve controlling the flow of fluid therethrough in a plurality of paths and including a valve element positionable into a plurality of operative positions to produce different flow paths through said conduits in each of the positions of said valve element, power means operatively connected with said valve element to move it into desired positions of adjustment, monitoring means positionable to actuate said power means to move into different selected positions so as to move said valve element into its various operative positions, a hand grip operable to position said monitoring means to select the desired position of said valve element, an adjustable flow diagram associated with said monitoring means including a flow diagram having indicia thereon representing the paths of fluid flow through said conduits to said valve, and also including a disk mounted for movement with said hand grip and having flow paths thereon representing the paths of the flow of fluid through said valve element and movable with said hand grip and valve element to complete the paths of fluid flow through said conduits represented on said diagram for the various operative positions of said valve element.

KARL B. BRITTON.

REFERENCES CITED

The following references are of record in the file of this patent:

UNITED STATES PATENTS

| Number | Name | Date |
| --- | --- | --- |
| 1,266,627 | Renme | May 21, 1918 |
| 1,303,290 | Gibbs | May 13, 1919 |
| 1,329,997 | Page | Feb. 3, 1920 |
| 1,356,598 | Cahill | Oct. 26, 1920 |
| 1,408,611 | Larner | Mar. 7, 1922 |
| 1,897,303 | Da Silva | Feb. 14, 1933 |
| 1,976,445 | Jurs | Oct. 9, 1934 |
| 1,988,841 | Hayward | Jan. 22, 1935 |
| 2,057,834 | Jurs | Oct. 20, 1936 |
| 2,140,667 | Corsepius | Dec. 20, 1938 |
| 2,250,453 | Appel | July 29, 1941 |
| 2,268,957 | Muselier | Jan. 6, 1942 |
| 2,327,373 | Samiran | Aug. 24, 1943 |
| 2,329,661 | Smith | Sept. 14, 1943 |
| 2,341,538 | Grant | Feb. 15, 1944 |